United States Patent [19]

Nishimura et al.

[11] Patent Number: 5,487,035
[45] Date of Patent: Jan. 23, 1996

[54] METHOD OF MULTIPLEXED DATA READING/WRITING SUITABLE FOR VIDEO-ON-DEMAND SYSTEM

[75] Inventors: Kazutoshi Nishimura, Tokyo; Hideki Sakamoto, Saitamaken; Hideharu Suzuki, Tokyo, all of Japan

[73] Assignee: Nippon Telegraph and Telephone Corporation, Tokyo, Japan

[21] Appl. No.: 296,725

[22] Filed: Aug. 26, 1994

[30] Foreign Application Priority Data

Aug. 26, 1993  [JP]  Japan .................................. 5-234218

[51] Int. Cl.⁶ ............................. H04Q 11/04; G11C 7/00
[52] U.S. Cl. ............................. 365/189.02; 365/189.01; 370/77; 370/84; 370/85.7; 370/100.1
[58] Field of Search ........................ 365/189.01, 189.02; 370/77, 84, 85.7, 100.1

[56] References Cited

U.S. PATENT DOCUMENTS 5,136,579  8/1992  Nguyen .................................... 370/59
5,377,144  12/1994  Brown ................................. 365/189.02

FOREIGN PATENT DOCUMENTS

1-5132    1/1989  Japan .
4269807   9/1992  Japan .
5-35407   2/1993  Japan .

*Primary Examiner*—Viet Q. Nguyen
*Attorney, Agent, or Firm*—Banner & Allegretti, Ltd.

[57] ABSTRACT

A method of multiplexed data reading/writing capable of admitting more than n requests simultaneously in a configuration in which m sets of n-fold multiplexed sub-systems are provided in parallel. Each data is divided into a plurality of segment data which are stored in a prescribed order among the memory devices, and m memory control units are connected with m×n input/output channels selectively and sequentially in units of time-slots such that each memory control unit is connected with each of input/output channel at least once within a prescribed period. Then, the reading/writing operations of the segment data stored in the memory devices are carried out by making accesses from m memory control units in parallel at each time-slot such that each segment data read/written by each memory control unit from/into one of the memory devices connected thereto at each time-slot is transmitted to/from one of m×n input/output channels connected thereto at each time-slot.

8 Claims, 9 Drawing Sheets

| TIME-SLOT<br>MEMORY CONTROL UNIT | $TS_1$ | $TS_2$ | ... | $TS_{10}$ |
|---|---|---|---|---|
| $MC_{01}$ | $C_1$ | $C_2$ | ... | $C_{10}$ |
| $MC_{11}$ | $C_{11}$ | $C_{12}$ | ... | $C_{20}$ |
| $MC_{21}$ | $C_{21}$ | $C_{22}$ | ... | $C_{30}$ |
| $MC_{31}$ | $C_{31}$ | $C_{32}$ | ... | $C_{40}$ |

(columns span ←PERIOD→)

FIG. 4

| TIME-SLOT i \ MEMORY CONTROL UNIT j | 0th SMALL PERIOD | | | | 1st SMALL PERIOD | | | | 2nd SMALL PERIOD | | | | 3rd SMALL PERIOD | | | |
|---|---|---|---|---|---|---|---|---|---|---|---|---|---|---|---|---|
| | TS1 | TS2 | ... | TS10 | TS1 | TS2 | ... | TS10 | TS1 | TS2 | ... | TS10 | TS1 | TS2 | ... | TS10 |
| | 1 | 2 | ... | 10 | 1 | 2 | ... | 10 | 1 | 2 | ... | 10 | 1 | 2 | ... | 10 |
| | 0 | | | | 1 | | | | 2 | | | | 3 | | | |
| $MC_0$ | $C_1$ | $C_2$ | ... | $C_{10}$ | $C_{11}$ | $C_{12}$ | ... | $C_{20}$ | $C_{21}$ | $C_{22}$ | ... | $C_{30}$ | $C_{31}$ | $C_{32}$ | ... | $C_{40}$ |
| $MC_1$ | $C_{11}$ | $C_{12}$ | ... | $C_{20}$ | $C_{21}$ | $C_{22}$ | ... | $C_{30}$ | $C_{31}$ | $C_{32}$ | ... | $C_{40}$ | $C_{1}$ | $C_{2}$ | ... | $C_{10}$ |
| $MC_2$ | $C_{21}$ | $C_{22}$ | ... | $C_{30}$ | $C_{31}$ | $C_{32}$ | ... | $C_{40}$ | $C_{1}$ | $C_{2}$ | ... | $C_{10}$ | $C_{11}$ | $C_{12}$ | ... | $C_{20}$ |
| $MC_3$ | $C_{31}$ | $C_{32}$ | ... | $C_{40}$ | $C_{1}$ | $C_{2}$ | ... | $C_{10}$ | $C_{11}$ | $C_{12}$ | ... | $C_{20}$ | $C_{21}$ | $C_{22}$ | ... | $C_{30}$ |

LARGE PERIOD

METHOD OF MULTIPLEXED DATA READING/WRITING SUITABLE FOR VIDEO-ON-DEMAND SYSTEM

BACKGROUND OF THE INVENTION

1. Field of the Invention

The present invention relates to a method for multiplexed reading or writing of large sized files such as those of the video data, and more particularly, to a method for multiplexed reading or writing of data capable of improving the multiplexed operation performance in the video-on-demand system at a time of executing a plurality of reading requests or writing requests simultaneously with respect to a memory device storing a multiplicity of video data accompanied by audio data.

2. Description of the Background Art

In the conventional video-on-demand system in which a center device and a number of terminals are connected, when a terminal requests a reception of a desired video program to the center device, the center device reads out data of the requested video program from a memory device and transmits the read out video data to the requesting terminal.

In such a case, there is a possibility for the other request from the other terminal to arrive at the center device while reading out the data of the requested video program from the memory device in response to the request from one terminal, and in order to deal with such a situation, it is necessary to provide a multiplexed reading/writing operation with respect to the memory device. To this end, there has been a proposition of the multiplexed reading device as disclosed in Japanese Patent Application Laid Open No. 4-269087 (1992) which is capable of executing the reading operation with respect to the memory device (magnetic disk device) at a higher rate than the bit rate of the video program in time sharing basis.

Namely, in this conventional multiplexed reading device, the compression encoded video data are stored on disks, and the utilization time-slots $TS_1$ to $TS_n$ of the disk device are assigned sequentially in this same order at every one of the first and subsequent operation periods. On the disks to be reproduced by the disk device, each video data is recorded by being divided into a number of pieces, such that when these divided pieces are sequentially read out by making accesses at the first time-slot $TS_1$ of the first period, the first time-slot $TS_1$ of the second period, and so on up to the first time-slot $TS_1$ of the n-th period, and then joined together, one continuous video data can be obtained. Similarly, the access and reading of the video data are carried out such that when the data read out at the same i-th time-slots $TS_i$ of the different periods are joined in a correct order, one continuous video data can be obtained. The data reproduced from the disks in this manner are then written into a buffer memory for the purpose of expanding the compression encoded video data by an expansion device to recover the normal video data, and the recovered normal video data are transmitted to the terminal to display the visual images according to the normal video data at a display monitor of the terminal.

Now, in order to increase the number of multiplexed reading operations at the center device as a whole, it is possible to consider a system configuration in which a plurality of multiplexed reading devices as described above are provided in parallel.

Figure 1:
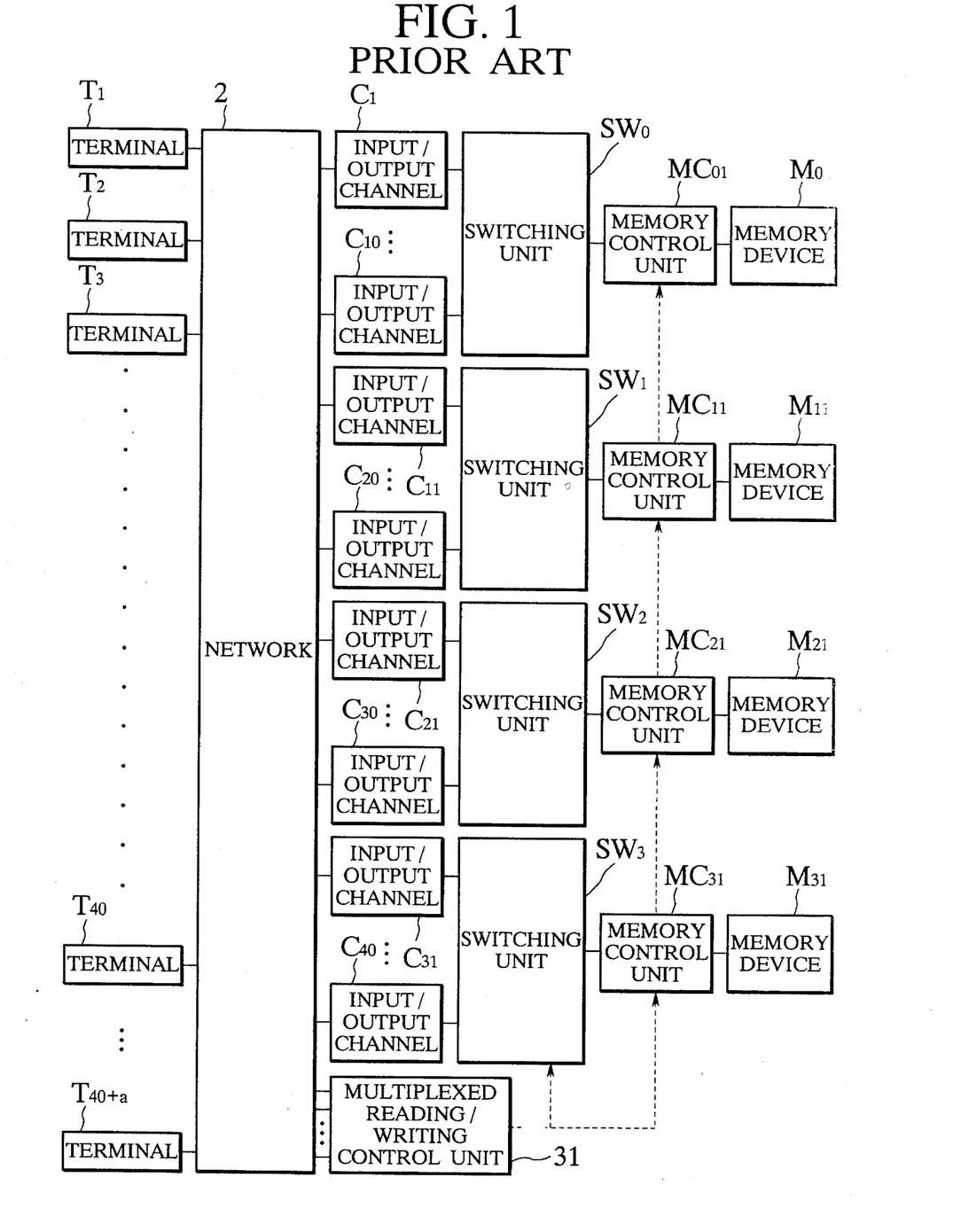
FIG. 1 is a schematic block diagram of a video-on-demand system incorporating a conventional multiplexed data reading device.

FIG. 1 shows an exemplary configuration of such a system in which a plurality of multiplexed reading devices are provided in parallel. This configuration of FIG. 1 includes a number of terminals $T_1$ to $T_{40+a}$ connected to a network 2, where each terminal includes a communication control unit, a decoder, an AV device, and an input device (not shown) such that the request of the user specified at the input device are transmitted to the center device by the communication control unit, while the video data received from the center device are decoded (expanded) by the decoder and displayed by the AV device.

The network 2 is formed by the ISDN (Integrated Services Digital Network) for example, and equipped with a number of input/output channels $C_1$ to $C_{40}$, where each input/output channel is in a form of a board mounting a buffer memory and a communication processing device (not shown).

The configuration of FIG. 1 further includes four memory devices $M_{01}$ to $M_{31}$ such as the magnetic disk devices, which are connected with the input/output channels $C_1$ to $C_{40}$ through memory control units $MC_{01}$ to $MC_{31}$ and switching units $SW_0$ to $SW_3$. Here, four memory control units $MC_{01}$ to $MC_{31}$ are provided within the center device, where each memory control unit is in a form of a magnetic disk control board. In a case of the SCSI (Small Computer System Interface), one memory control unit can be connected with up to seven memory devices in series to expand the memory capacity.

The switching units $SW_0$ to $SW_3$ are formed by the VME (Versa Module Europe) bus which constitutes the transmission paths between the memory control units $MC_{01}$ to $MC_{31}$ and the input/output channels $C_1$ to $C_{40}$. In this example, a number of time-slots in each period is set to 10, so that each switching unit connects ten of the input/output channels to one memory control unit and each memory control unit has a capacity to handle ten multiplexed reading/writing operations within each period.

The configuration of FIG. 1 also includes a multiplexed reading/writing control unit 31 formed by a communication control unit and a micro-processor (not shown), which admits the requests from the terminals $T_1$ to $T_{40+a}$, and issues commands for the multiplexed reading/writing operations to the memory control units $MC_{01}$ to $MC_{31}$ and the switching units $SW_0$ to $SW_3$.

In this configuration of FIG. 1, when a user at one of the terminals $T_1$ to $T_{40+a}$ requests a desired video program, the request is transmitted to the multiplexed reading/writing control unit 31 within the center device through the network 2. In response, the multiplexed reading/writing control unit 31 searches out an appropriate one of the memory devices $M_{01}$ to $M_{31}$ which stores the data of the requested video program, and commands one of the memory control units $MC_{01}$ to $MC_{31}$ connected with the searched out appropriate memory device to execute the reading of the data of the requested video program.

Here, the multiplexed reading/writing control unit 31 allocates the input/output channels $C_1$ to $C_{10}$ as the output destinations of up to ten video program requests with respect to the memory control unit $MC_{01}$ in an order of arrivals, and returns a center busy signal to all the terminals requesting the requests in excess of ten. The data of ten video programs are read out from the memory device $M_{01}$ in units of segments at ten time-slots of each period, respectively, through the memory control unit $MC_{01}$ under the control of the multiplexed reading/writing control unit 31, and transmitted to the respective allocated input/output channels $C_1$ to $C_{10}$ through the switching unit $SW_0$. The other memory control units $MC_{11}$, $MC_{21}$, and $MC_{31}$ are similarly connected with the other input/output channels $C_{11}$ to $C_{20}$, $C_{21}$ to $C_{30}$, and $C_{31}$ to $C_{40}$ through the other switching units $SW_1$, $SW_2$, and $SW_3$, respectively.

Figure 2:
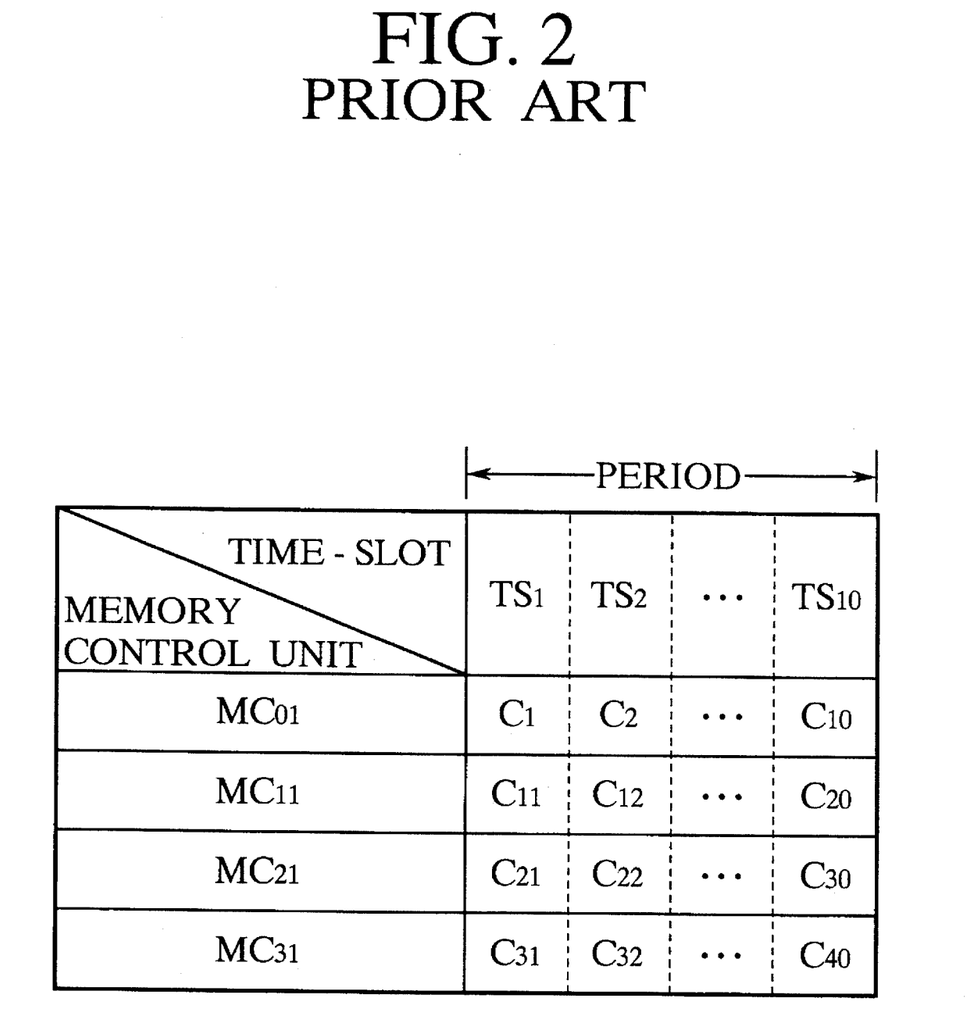
FIG. 2 is a table summarizing connection relationships between memory control units and input/output channels in the system of FIG. 1

Thus, in this case, the input/output channels $C_1$ to $C_{40}$ and the memory control units $MC_{01}$ to $MC_{31}$ are connected in correspondence relationship as summarized in the table shown in FIG. 2. Namely, the memory control unit $MC_{01}$ is sequentially connected with the input/output channel $C_1$ at the first time-slot $TS_1$ of each period, the input/output channel $C_2$ at the second time-slot $TS_2$ of each period, and so on. The connection and reading operations by the input/output channels $C_1$ to $C_{40}$ and the memory control unit $MC_{01}$ to $MC_{31}$ according to this correspondence relationship of FIG. 2 is repeated in each period. Each of the input/output channels $C_1$ to $C_{40}$ transmits the segment data of the requested video programs received from the connected memory control units $MC_{01}$ to $MC_{31}$ to the respective requesting terminals through the network 2. Then, at each terminal, the sequentially transmitted series of segment data for the requested video program are decoded and displayed.

In this conventional multiplexed reading device of FIG. 1, four of ten-fold multiplexed sub-systems are provided in parallel to improve the multiplexed reading capacity of the center device to up to 10×4=40, but this type of the conventional multiplexed reading device has a problem in that the requests in excess of ten with respect to each memory device cannot be admitted even when a large number of requests from the terminals are concentrated onto a particular video program stored in a particular memory device, no matter how many sub-systems are provided in parallel. In other words, in this type of the conventional multiplexed reading device, when m sets of n-fold multiplexed sub-systems are provided in parallel, regardless of how large the number m of the sub-systems provided in parallel may be, the maximum number of requests that can be admitted simultaneously with respect to each memory device is limited to the number n of the multiplexed reading operations supported by each sub-system, so that the service of a particular video program can be provided with respect to only up to n terminals simultaneously even when more than n terminals requested this particular video program.

SUMMARY OF THE INVENTION

It is therefore an object of the present invention to provide a method of multiplexed data reading/writing capable of admitting more than n requests simultaneously in a configuration in which m sets of n-fold multiplexed sub-systems are provided in parallel.

According to one aspect of the present invention there is provided a method of multiplexed data reading/writing with respect to a plurality of memory devices through m memory control means connected to the memory devices and m×n input/output channels selectively connected to said m memory control means via switching means, where m and n are integers greater than one, the method comprising the steps of: (a) dividing each data into a plurality of segment data and storing the segment data of each data in a prescribed order among the memory devices; (b) connecting said m memory control means with said m×n input/output channels selectively and sequentially by the switching means in units of time-slots such that each of said m memory control means is connected with each of said m×n input/output channels at least once within a prescribed period; and (c) carrying out the reading/writing operations of the segment data stored by the step (a) in the memory devices by making accesses from said m memory control means in parallel at each time-slot such that each segment data read/written by each of said m memory control means from/into one of the memory devices connected thereto at each time-slot is transmitted to/from one of said m×n input/output channels connected by the step (b) thereto at each time-slot.

Other features and advantages of the present invention will become apparent from the following description taken in conjunction with the accompanying drawings.

DETAILED DESCRIPTION OF THE PREFERRED EMBODIMENTS

Now, one embodiment of the method of multiplexed data reading/writing according to the present invention will be described in detail.

Figure 3:
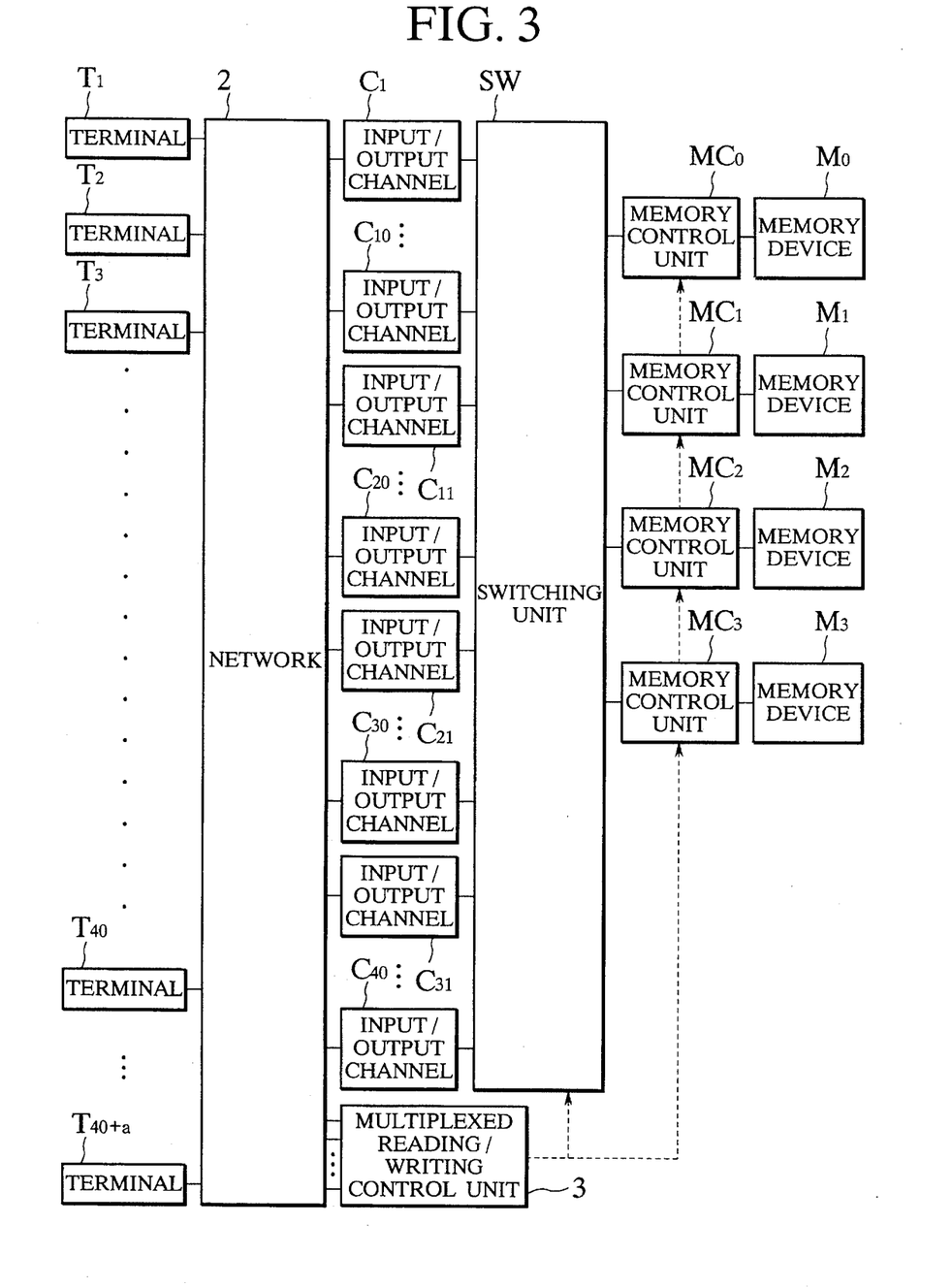
FIG. 3 is a schematic block diagram of a video-on-demand system suitable for carrying out the method of multiplexed data reading/writing according to the present invention.

In this embodiment, the video-on-demand system has a schematic configuration as shown in FIG. 3, which comprises terminals $T_1$ to $T_{40+a}$ connected with a center device through a network 2, and a center device including a multiplexed reading/writing control unit 3 and input/output channels $C_1$ to $C_{40}$ connected to the network 2, and four memory devices $M_0$ to $M_3$ connected with the input/output channels $C_1$ to $C_{40}$ through a switching unit SW and four memory control units $MC_0$ to $MC_3$ which are controlled by the multiplexed reading/writing control unit 3.

Here, each terminal includes a communication control unit, a decoder, an AV device, and an input device (not shown) such that the request of the user specified at the input device are transmitted to the center device by the communication control unit, while the video data received from the center device are decoded (expanded) by the decoder and displayed by the AV device. The network 2 is formed by the ISDN (Integrated Services Digital Network) for example, while each input/output channel is in a form of a board mounting a buffer memory and a communication processing device (not shown). Each one of the memory devices $M_0$ to $M_3$ is the magnetic disk device, while each one of the memory control units $MC_0$ to $MC_3$ is in a form of a magnetic disk control board. In a case of the SCSI (Small Computer System Interface), one memory control unit can be connected with up to seven memory devices in series to expand the memory capacity. The switching unit SW is formed by the VME (Versa Module Europe) bus which constitutes the transmission paths between the memory control units $MC_0$ to $MC_3$ and the input/output channels $C_1$ to $C_{40}$, and the multiplexed reading/writing control unit 3 is formed by a communication control unit and a micro-processor (not shown), which admits the requests from the terminals $T_1$ to $T_{40+a}$, and issues commands for the multiplexed reading/writing operations to the memory control units $MC_0$ to $MC_3$ and the switching unit SW.

With this configuration of FIG. 3, the method of multiplexed data reading/writing according to the present invention is carried out as follows.

First, the data of each video program are encoded (compressed) at the bit rate of R bit/sec, and divided into a number of segments in units of S bits starting from the top of the encoded data. Then, the divided segments are cyclically stored in the memory devices $M_0$, $M_1$, $M_2$, and $M_3$ starting from the top segment, in an order to be described below.

When a user at one of the terminals $T_1$ to $T_{40+a}$ requests a desired video program, the request is transmitted to the multiplexed reading/writing control unit 3 within the center device through the network 2.

Figure 4:
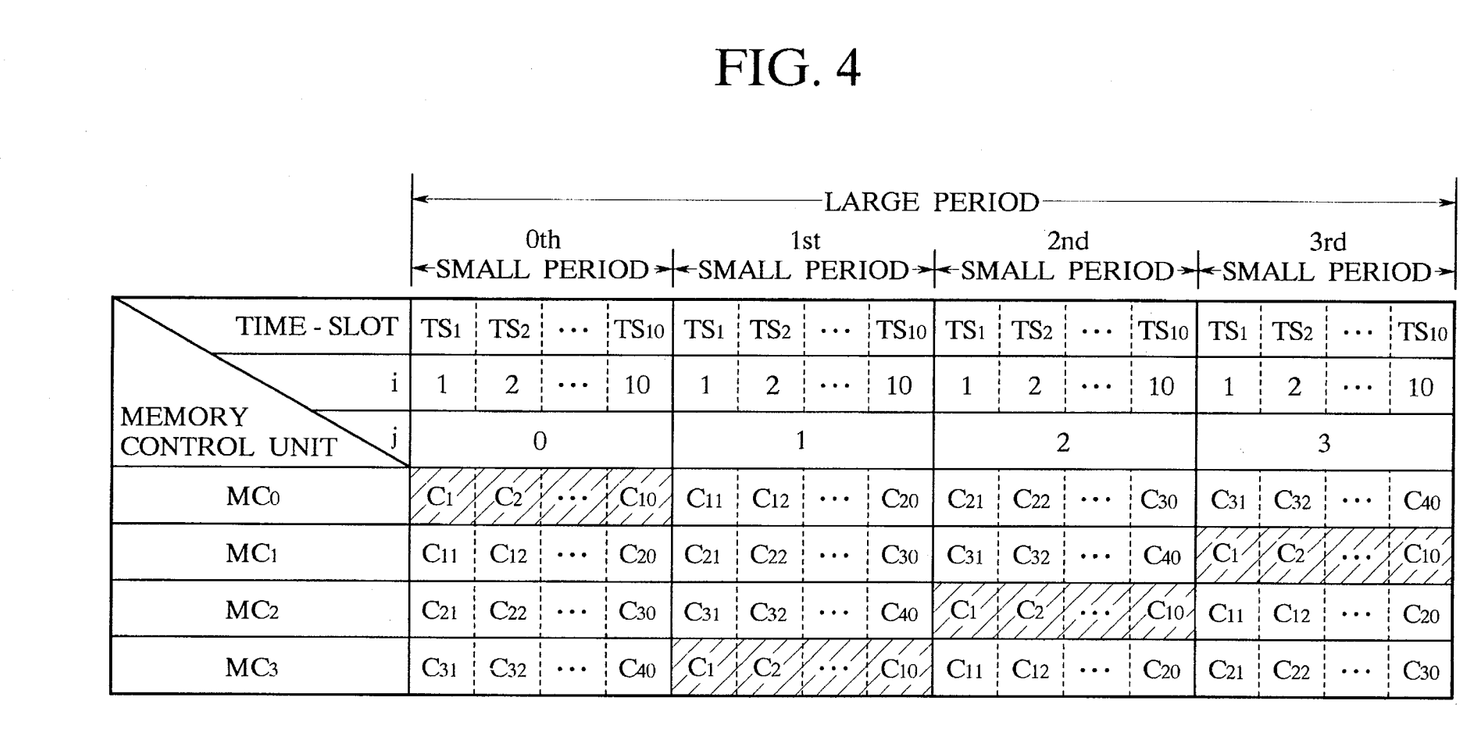
FIG. 4 is a timing chart showing connection relationships between memory control units and input/output channels according to one embodiment of the method of multiplexed data reading/writing according to the present invention.

Here, in response to the received request, the multiplexed reading/writing control unit 3 controls the connection and reading/writing operations by the input/output channels $C_1$ to $C_{40}$ and the memory control units $MC_0$ to $MC_3$ according to the timing chart of FIG. 4.

In FIG. 4, one small period is formed by ten time-slots $TS_1$ to $TS_{10}$, while one large period is formed by as many small periods as a number of the memory control units provided. In this example, as there are four memory control units $MC_0$ to $MC_3$, so that one large period is formed by four (0th, 1st, 2nd, and 3rd) small periods. Within each large period, the operations of small periods are carried out in an order of these small periods sequentially such that when the operation of the 0th period is completed, the operation of the 1st period is started, and so on. The operation of the large period is repeated as many times as necessary. In this example, each time-slot takes 0.1 sec. for example, such that each small period takes 1 sec. and each large period takes 4 sec.

According to the timing chart of FIG. 4, at the 0th small period, the memory control unit $MC_0$ is sequentially connected with the input/output channel $C_1$ at the first time-slot $TS_1$, the input/output channel $C_2$ at the second time-slot $TS_2$, and so on, up to the input/output channel $C_{10}$ at the tenth time-slot $TS_{10}$. Meanwhile, at this 0th small period, the memory control unit $MC_1$ is sequentially connected with the input/output channels $C_{11}$, ($C_{12}$, ..., $C_{20}$ at the time-slots $TS_1$, $TS_2$, ..., $TS_{10}$, respectively, the memory control unit $MC_2$ is sequentially connected with the input/output channels $C_{21}$, $C_{22}$, ..., $C_{30}$ at the time-slots $TS_1$, $TS_2$, ..., $TS_{10}$, respectively, and the memory control unit $MC_3$ is sequentially connected with the input/output channels $C_{31}$, $C_{32}$, ..., $C_{40}$ at the time-slots $TS_1$, $TS_2$, ..., $TS_{10}$, respectively.

On the other hand, at the 1st small period, the memory control unit $MC_3$ is sequentially connected with the input/output channels $C_1$, $C_2$, ..., $C_{10}$ at the time-slots $TS_1$, $TS_2$, ..., $TS_{10}$, respectively, so that the connection relationship of this memory control unit $MC_0$ at the 1st small period is identical to that of the memory control unit $MC_{01}$ at the 0th small period. Similarly, the connection relationship of the memory control unit $MC_{01}$ at the 1st small period is identical to that of the memory control unit $MC_1$ at the 0th small period, the connection relationship of the memory control unit $MC_{01}$ at the 1st small period is identical to that of the memory control unit $MC_2$ at the 0th small period, and the connection relationship of the memory control unit $MC_2$ at the 1st small period is identical to that of the memory control unit $MC_3$ at the 0th small period.

In other words, the connection relationships with respect to the input/output channels $C_1$ to $C_{40}$ are cyclically rotated among the memory control units $MC_0$, $MC_1$, $MC_2$, and $MC_3$, such that the connection relationships at the 1st small period can be obtained by cyclically rotating the connection relationships at the 0th small period by a unit of one memory control unit, the connection relationships at the 2nd small period can be obtained by cyclically rotating the connection relationships at the 0th small period by a unit of two memory control unit, and the connection relationships at the 3rd small period can be obtained by cyclically rotating the connection relationships at the 0th small period by a unit of three memory control unit. In order to make it easier to comprehend such cyclic rotations of the connection relationships, the entries for the connections with the input/output channels $C_1$ to $C_{10}$ at the time-slots $TS_1$ to $TS_{10}$ in each small period are shaded.

Thus, the input/output channel $C_1$ is sequentially connected with the memory control units $MC_0$, $MC_3$, $MC_2$, and $MC_1$ at the first time-slot $TS_1$ of the 0th, 1st, 2nd, and 3rd small periods, respectively, to store the segment data read out from the memory devices $M_0$, $M_3$, $M_2$, and $M_1$, while the input/output channel $C_2$ is sequentially connected with the memory control units $MC_0$, $MC_3$, $MC_2$, and $MC_1$ at the second time-slot $TS_1$ of the 0th, 1st, 2nd, and 3rd small periods, respectively, to store the segment data read out From the memory devices $M_0$, $M_3$, $M_2$, and $M_1$, and so on. Consequently, the input/output channel $C_{30}$ is sequentially connected with the memory control units $MC_2$, $MC_1$, $MC_0$, and $MC_3$ at the tenth time-slot $TS_{10}$ of the 0th, 1st, 2nd, and 3rd small periods, respectively, to store the segment data read out from the memory devices $M_2$, $M_1$, $M_0$, and $M_3$, for example.

Here, each of the input/output channel can be equipped with double buffers, such that for example, when the input/output channel $C_1$ is connected with the memory control unit $MC_0$ to receive one segment data from the memory device $M_0$ at the first time-slot $TS_1$ of the 0th small period, the received segment data is stored in one of the double buffers and this segment data is expanded and displayed at the terminal connected to the input/output channel $C_1$ during a period of time between the second time-slot $TS_1$ of the 0th small period and the first time-slot $TS_1$ of the 1st small period. Then, when the input/output channel $C_1$ is connected with the memory control unit $MC_{03}$ to receive one segment data from the memory device $M_3$ at the first time-slot $TS_1$ of the 1st small period, the received segment data is stored in another one of the double buffers and this segment data is expanded and displayed at the terminal connected to the input/output channel $C_1$ during a period of time between the second time-slot $TS_2$ of the 1st small period and the first time-slot $TS_1$ of the 2nd small period, and so on. Instead of such double buffers, each of the input/output channel may be equipped with the FIFO (First-In First-Out) buffer, if desired.

In correspondence, the divided segments of the data for each video program are cyclically stored in the memory devices $M_0$, $M_1$, $M_2$, and $M_3$ in such an order that the continuous data can be obtained by joining the segments data read out from the memory devices $M_0$, $M_3$, $M_2$, and $M_1$ at the first time-slot $TS_1$ of the 0th, 1st, 2nd, and 3rd small periods, respectively, and so on.

In this manner, at each small period, 40 different video data corresponding to 40 different video program requests from 40 different terminals can be read out in units of segments from the memory devices $M_0$ to $M_3$ through the memory control units $MC_0$ to $MC_3$ under the control of the multiplexed reading/writing control unit 3, and transferred to the respective allocated input/output channels $C_1$ to $C_{40}$ through the switching unit SW under the control of the multiplexed reading/writing control unit 3, and then transmitted to the respective requested terminals among the terminals $T_1$ to $T_{40+a}$ through the network 2. At each of the terminals $T_1$ to $T_{40+a}$, the series of segment data transmitted from the network 2 are decoded and displayed.

Thus, in this embodiment, the multiplexed reading/writing operation capacity of the center device is 4×10=40, so that the multiplexed reading/writing control unit 3 allocates the input/output channels $C_1$ to $C_{40}$ as the output destinations of up to 40 video program requests with respect to each memory control unit in an order of arrivals, and returns a center busy signal to all the terminals requesting the requests in excess of 40.

Thus, in this case, the input/output channels $C_1$ to $C_{40}$ and the memory control units $MC_0$ to $MC_3$ are connected in correspondence relationship as summarized in the table shown in FIG. 4. Namely, the memory control unit $MC_0$ is sequentially connected with the input/output channel $C_1$ at the first time-slot $TS_1$ of each period, the input/output channel $C_2$ at the second time-slot $TS_2$ of each period, and so on. The connection and reading operations by the input/output channels $C_1$ to $C_{40}$ and the memory control unit $MC_0$ to $MC_3$ according to this correspondence relationship of FIG. 4 is repeated in each period. Each of the input/output channels $C_1$ to $C_{40}$ transmits the segment data of the requested video programs received from the connected memory control units $MC_0$ to $MC_3$ to the respective requesting terminals through the network 2. Then, at each terminal, the sequentially transmitted series of segment data for the requested video program are decoded and displayed.

In summary, in a case of synchronizing the operations to store the segment data into the buffer memories at each time-slot, the method of multiplexed data reading/writing in this embodiment proceeds according to the flow chart of FIG. 5 as follows.

First, the small period variable j is initialized to "0" (step S11), and the time-slot variable i is initialized to "1" (steps S12).

Then, the segment data read out from the memory device $M_0$ by the memory control unit $MC_0$ is stored into the buffer memory of the [(j mod 4).10+i]-th input/output channel, the segment data read out from the memory device $M_1$ by the memory control unit $MC_1$ is stored into the buffer memory of the [(j+1 mod 4).10+i]-th input/output channel, the segment data read out from the memory device $M_2$ by the memory control unit $MC_2$ is stored into the buffer memory of the [(j+2 mod 4).10+i]-th input/output channel, and the segment data read out from the memory device $M_3$ by the memory control unit $MC_3$ is stored into the buffer memory of the [(j+3 mod 4).10+i]-th input/output channel (step S13). Here, (j mod 4) denotes the residue of j divided by 4, and so on.

After four segment data are stored in the buffer memories of four different input/output channels, the time-slot variable i is increased by one unless the time-slot variable i is equal to 10 (steps S14 and S15) and the step S13 is repeated for the next time-slot.

When the time-slot variable i is equal 10 at the step S14, the small period variable j is increased by one unless the small period variable j is equal to 3 (steps S16 and S17) and the steps S12 to S15 are repeated for the next small period. When the small period variable j is equal to 3 at the step S16, the operation for one large period has been completed, and the operation returns to the step S11 for the next large period.

Figure 6:
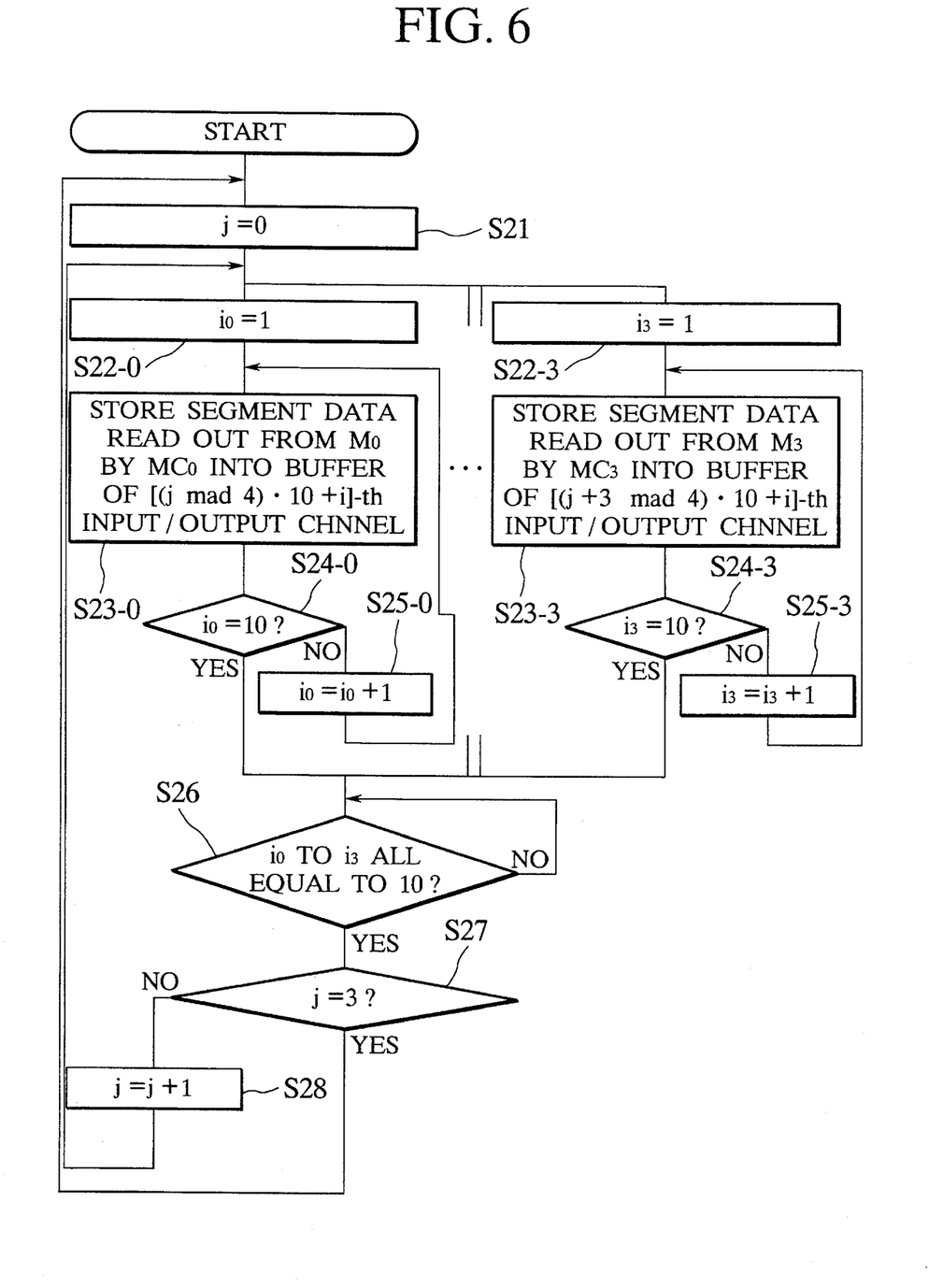
FIG. 6 is a flow chart for an alternative operation according to one embodiment of the method of multiplexed data reading/writing according to the present invention for a case of synchronization at each small period.

In the above embodiment, in a case of synchronizing the operations to store the segment data into the buffer memories at each small period, the method of multiplexed data reading/writing in this embodiment proceeds according to the flow chart of FIG. 6 as follows.

First, the small period variable j is initialized to "0" (step S21), and the time-slot variables $i_0$, $i_1$, $i_2$, and $i_3$ for the memory control units $MC_0$, $MC_1$, $MC_2$, and $MC_3$ are separately initialized to "1" (steps S22-0 to S22-3).

Then, the segment data read out from the memory device $M_0$ by the memory control unit $MC_0$ is stored into the buffer memory of the [(J mod 4).10+i]-th input/output channel (step S23-0), and the time-slot variable $i_0$ is increased by one unless the time-slot variable $i_0$ is equal to 10 (steps S24-0 and S25-0) and the step S13 is repeated for the next time-slot. The operations similar to these steps S23-0, S24-0, and S25-0 are also carried out with respect to the other memory control units $MC_1$, $MC_2$, and $MC_3$ in parallel.

Then, after all four time-slot variables $i_0$, $i_1$, $i_2$, and $i_3$ becomes equal to 10 (step S26), the small period variable j is increased by one unless the small period variable j is equal to 3 (steps S27 and S28) and the steps S22 to S26 are repeated for the next small period. When the small period variable j is equal to 3 at the step S27, the operation for one large period has been completed, and the operation returns to the step S21 for the next large period. Thus, in this case, only the beginning of the operation of each small period is synchronized while the operation of each time-slot within each small period is carried independently by each memory control unit. Consequently, the order of each ten input/output channels to be operated within the same small period may be changed freely if desired.

As described, according to this embodiment, it is possible to read out 40 different video data and store them in different input/output channels at each small period, so that it becomes possible to admit 40 different video program requests from 40 different terminals simultaneously in the configuration in which 4 sets of 10-fold multiplexed subsystems are provided in parallel.

Figure 7:
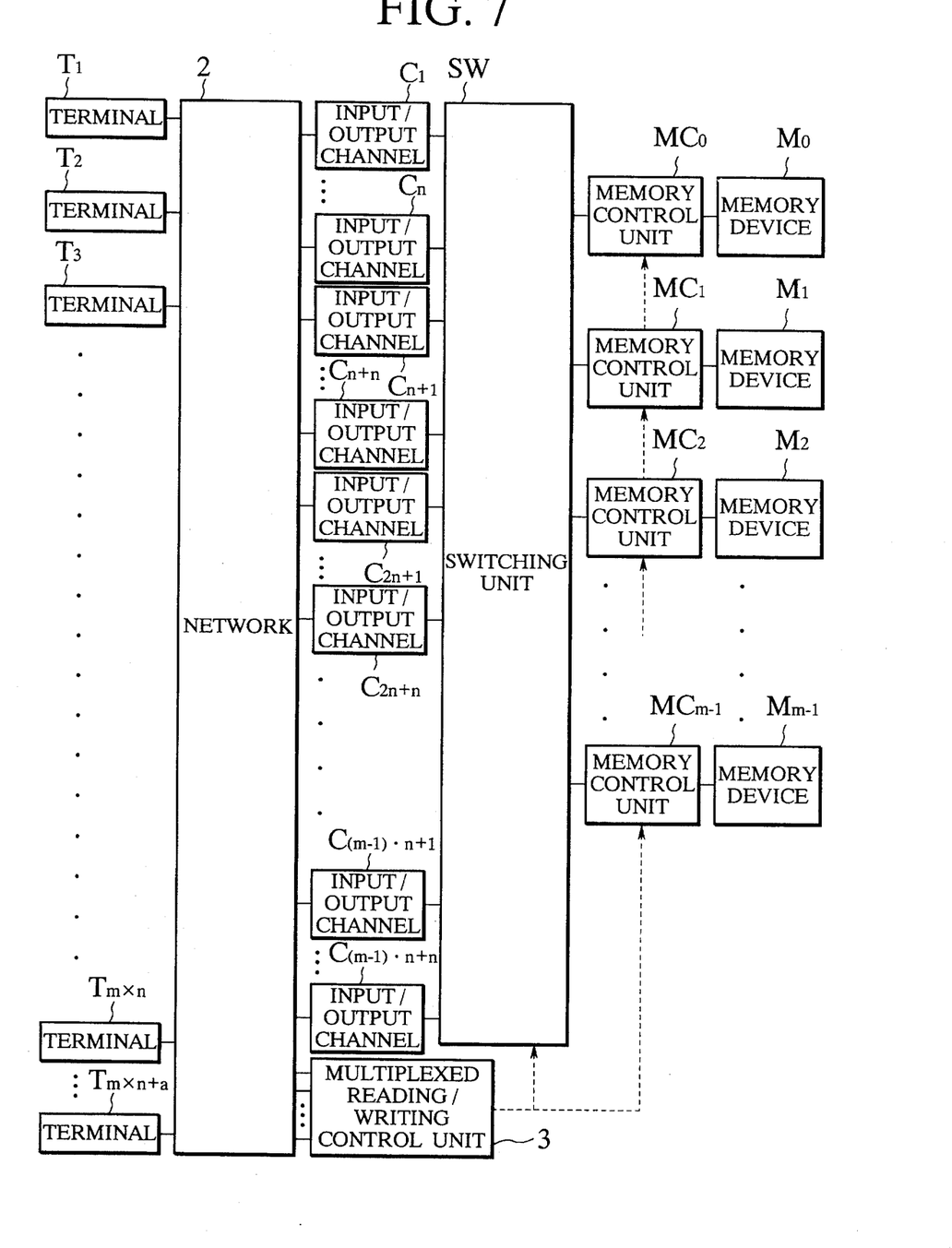
FIG. 7 is a schematic block diagram of a video-on-demand system generalizing the configuration of FIG. 3.

It is to be noted that the above described embodiment can be generalized as follows Namely, In this generalized case, the video-on-demand system has a schematic configuration as shown in FIG. 7 instead of the configuration of FIG. 3, which comprises terminals $T_1$ to $T_{m.n+}$, connected with a center device through a network 2, and a center device including a multiplexed reading/writing control unit 3 and input/output channels $C_1$ to $C_{(m-1).n+n}$ connected to the network 2, and m memory devices $M_0$ to $M_{m-1}$ connected with the input/output channels $C_1$ to $C_{(m-1).n+n}$ through a switching unit SW and m memory control units $MC_0$ to $MC_{m-1}$ which are controlled by the multiplexed reading/writing control unit 3, where m is an integer greater than one.

Here, in a case the time required for the reading/writing with respect to the memory devices $M_0$ to $M_{m-1}$ to be ready since the commands are given from the multiplexed reading/writing control unit 3 to the memory control units $MC_0$ to $MC_{m-1}$ is A sec. and the reading/writing speed with respect to the memory devices $M_0$ to $M_{m-1}$ is T bit/sec, a number n can be any integer not greater than a value obtained by dividing the decoding and display time S/R for each segment data by the reading/writing operation time A+S/T.

Figure 8:
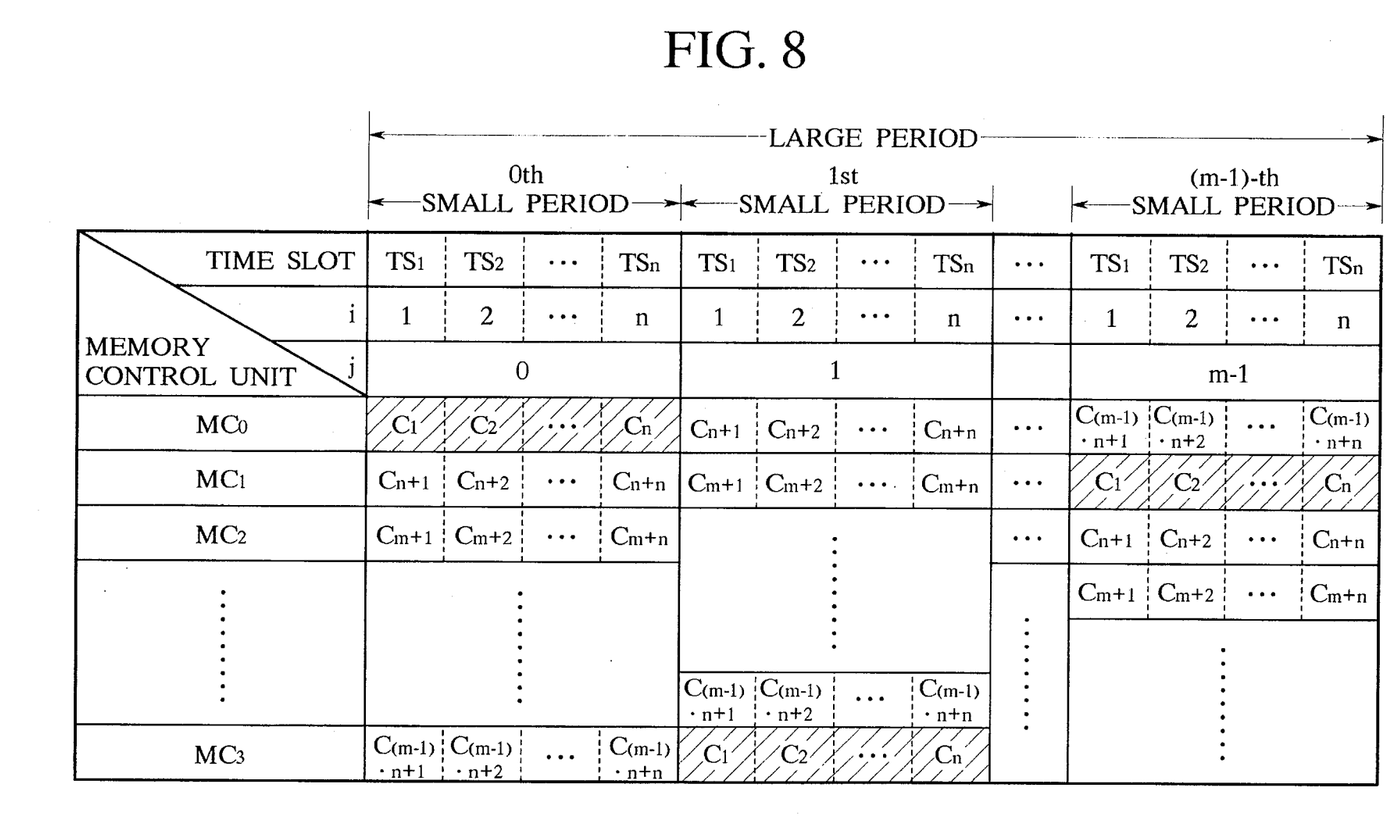
FIG. 8 is a timing chart showing the connection relationships between memory control units and input/output channels generalizing those shown in FIG. 4.

Also, in this generalized case, the multiplexed reading/writing control unit 3 controls the connection and reading/writing operations by the input/output channels $C_1$ to $C_{(m-1).n+n}$ and the memory control units $MC_0$ to $MC_{m-1}$ according to the timing chart of FIG. 8 instead of the timing chart of FIG. 4.

Figure 5:
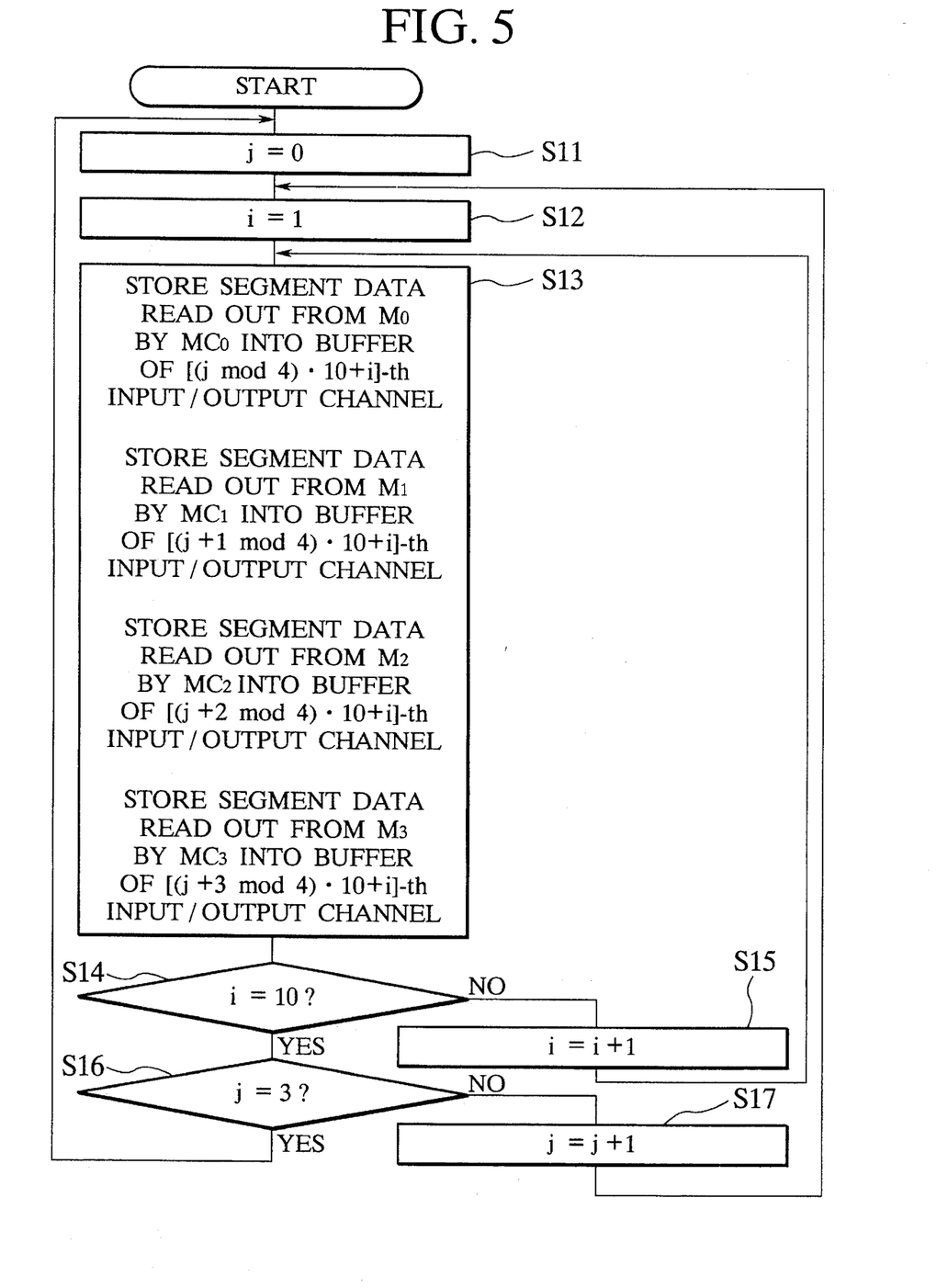
FIG. 5 is a flow chart for an operation according to one embodiment of the method of multiplexed data reading/writing according to the present invention for a case of synchronization at each time-slot.
Figure 9:
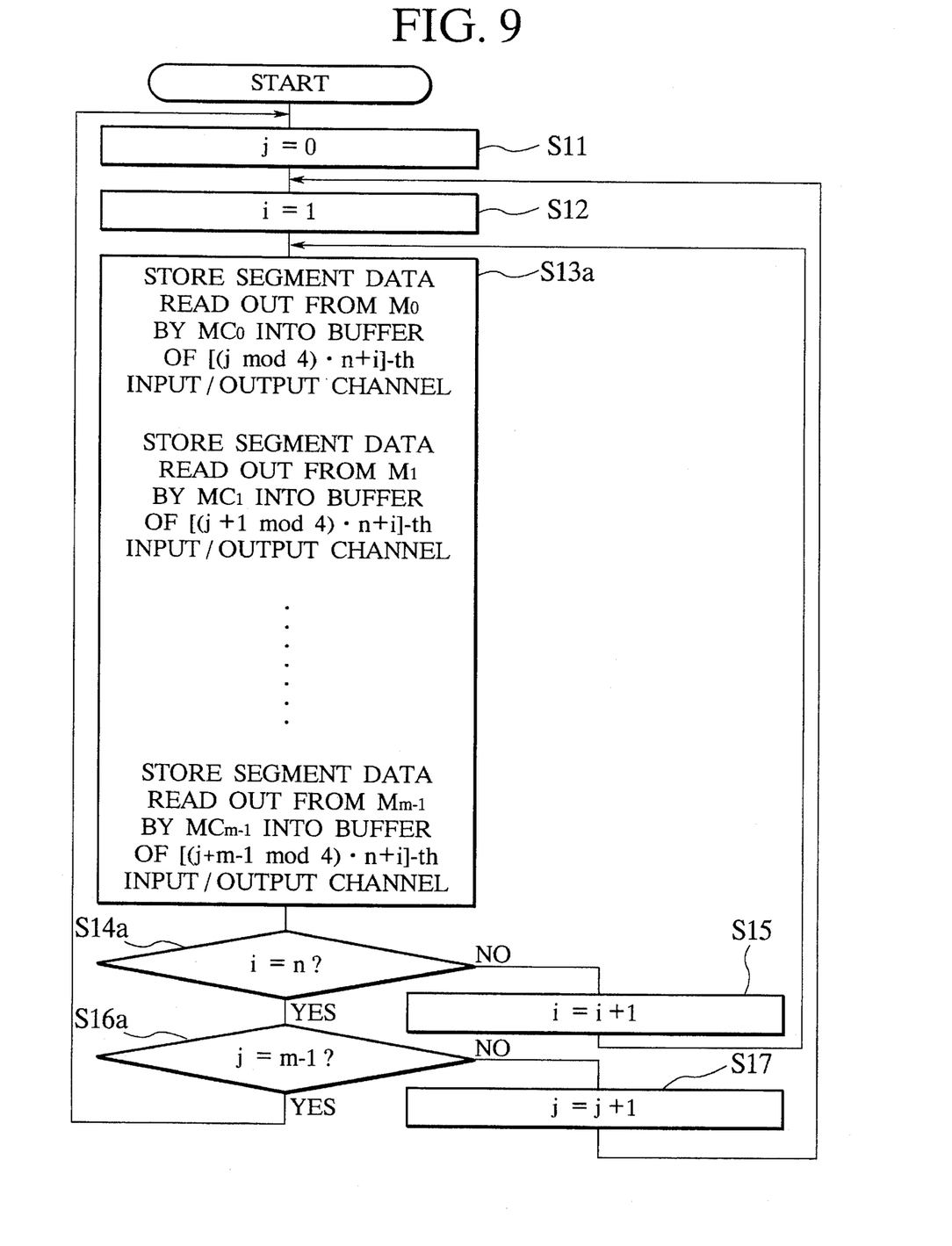
FIG. 9 is a flow chart for an operation generalizing that of FIG. 5.

Thus, in a case of synchronizing the operations to store the segment data into the buffer memories at each time-slot, the method of multiplexed data reading/writing in this generalized case proceeds according to the flow chart of FIG. 9 instead of the flow chart of FIG. 5.

Here, the steps S11, S12, S15, and S17 are the same as those in FIG. 5, while the steps S13, S14, and S16 are generalized to the steps S13a, S14a, and S16a as follows.

Namely, at the step S13a, the segment data read out from the memory device $M_0$ by the memory control unit $MC_0$ is stored into the buffer memory of the [(j mod m).n+i]-th input/output channel, the segment data read out from the memory device $M_1$ by the memory control unit $MC_1$ is stored into the buffer memory of the [(j+1 mod m).n+i]-th input/output channel, and so on, up to the segment data read out from the memory device $M_{m-1}$ by the memory control unit $MC_{m-1}$ which is stored into the buffer memory of the [(j+m-1 mod m).n+i]-th input/output channel.

Then, at the step S14a, after m segment data are stored in the buffer memories of m different input/output channels, the operation proceeds to the step S15 at which the time-slot variable i is increased by one unless the time-slot variable i is equal to n and the step S13a is repeated for the next time-slot.

When the time-slot variable i is equal n at the step S14a, next at the step 16a, the operation proceeds to the step S17 at which the small period variable j is increased by one unless the small period variable j is equal to m−1 and the steps S12 to S15 are repeated for the next small period. When the small period variable j is equal to m−1 at the step S16a, the operation for one large period has been completed, and the operation returns to the step S11 for the next large period.

Thus, in this generalized case, it is possible to read out m×n different video data and store them in different input/output channels at each small period, so that it becomes possible to admit m×n different video program requests from m×n different terminals simultaneously in the configuration in which m sets of n-fold multiplexed sub-systems are provided in parallel.

It should be understood from the above description that, in the most general manner, the method of multiplexed data reading/writing according to the present invention as described above can be expressed as the method of multiplexed data reading/writing with respect to a plurality of memory devices through m memory control units connected to the memory units and m×n input/output channels selectively connected to the m memory control devices via switching unit, where m and n are integers greater than one, the method comprising the steps of: dividing each data into a plurality of segment data and storing the segment data of each data in a prescribed order among the memory devices; connecting the m memory control units with the m×n input/output channels selectively and sequentially by the switching unit in units of time-slots such that each of the m memory control units is connected with each of the m×n input/output channels at least once within a prescribed period; and carrying out the reading/writing operations of the segment data stored in the memory devices by making accesses from the m memory control units in parallel at each time-slot such that each segment data read/written by each of the m memory control units from/into one of the memory devices connected thereto at each time-slot is transmitted to/from one of the m×n input/output channels connected thereto at each time-slot.

It is also to be noted that, although the above embodiment has been mainly described for the case of the data reading operation, the case of the data writing operation can be carried out similarly. For example, in the flow chart of FIG. 5, it suffices to change the reading operation to store the segment data read out from the memory device $M_0$ by the memory control unit $MC_0$ into the buffer memory of the [(j mod 4).10+i]-th input/output channel at the step S13 to the writing operation to write the segment data stored in the buffer memory of the [(j mod 4).10+i]-th input/output channel into the memory device $M_{01}$ through the memory control unit $MC_0$.

Also, the operations concerning the input/output channels can be carried out independently from each other, so that it is possible to carry out the reading operation for a part of the input/output channels while the writing operation is carried out for another part of the input/output channels.

It is also to be noted that, although the above embodiment has been described for the network type system, but the present invention is equally applicable to the stand alone type system. Moreover, the elements of the system may be given in any suitable forms of device combination other than the boards as described above. In addition, instead of providing the input/output channel for each transmission line, any desired number of the input/output channels formed on a common hardware may be used. Furthermore, the memory device may be any of the optical disk memory device, the semiconductor disk device, and the disk array device instead of the magnetic disk device as described above.

Also, as the decoding speed is faster than the reading speed in the present invention, whenever the buffer memory of the input/output channel becomes full, the reading operation of the segment data at the subsequent time-slots may be suspended.

It is also to be noted that, the operation according to the timing chart of FIG. 4 can be modified such that, after the operation between the memory control unit $MC_0$ and the input/output channels $C_1$ to $C_{10}$ is completed at the 0th small period, the same operation between the memory control unit $MC_0$ and the input/output channels $C_1$ to $C_{10}$ may be repeated before the operation between the memory control unit $MC_0$ and the other input/output channels $C_{11}$ to $C_{20}$ is carried out at the next small period. In other words, the combination of the memory control unit and the input/output channels may be changed at every prescribed number of time-slots other than n time-slots. It is also possible to synchronize the operations to store the segment data into the buffer memories at each large period (m×n time-slots).

It is further to be noted that besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of multiplexed data reading/writing with respect to a plurality of memory devices through m memory control means connected to the memory devices and m×n input/output channels selectively connected to said m memory control means via switching means, where m and n are integers greater than one, the method comprising the steps of:

(a) dividing each data into a plurality of segment data and storing the segment data of each data in a prescribed order among the memory devices;

(b) connecting said m memory control means with said m×n input/output channels selectively and sequentially by the switching means in units of time-slots such that each of said m memory control means is connected with each of said m×n input/output channels at least once within a prescribed period; and (c) carrying out the reading/writing operations of the segment data stored by the step (a) in the memory devices by making accesses from said m memory control means in parallel at each time-slot such that each segment data read/written by each of said m memory control means from/into one of the memory devices connected thereto at each time-slot is transmitted to/from one of said m×n input/output channels connected by the step (b) thereto at each time-slot.

2. The method of claim 1, wherein at the step (a), the prescribed order to store the segment data in the memory devices is a cyclic order among the memory devices.

3. The method of claim 1, wherein at the step (b), the prescribed period is defined by m×n×h time-slots divided into m small periods, each small period being defined by n×h time-slots, where h is a natural number, and said m memory control means are connected with said m×n input/output channels selectively and sequentially such that an l-th memory control means is connected with [(j+l mod m).n+ i]-th input/output channels for h times in a j-th small period, where l is an integer for which $0 \leq l \leq m-1$, j is an integer for which $0 \leq j \leq m-1$, and i is an integer for which $1 \leq i \leq n$.

4. The method of claim 1, wherein at the step (c), the reading/writing operations through said m memory control means and said m×n input/output channels are synchronized at each time-slot.

5. The method of claim 1, wherein at the step (c), the reading/writing operations through said m memory control means and said m×n input/output channels are synchronized at each n time-slots.

6. The method of claim 1, wherein at the step (c), the reading/writing operations through said m memory control means and said m×n input/output channels are synchronized at each small period defined by n×h time-slots, where h is a natural number.

7. The method of claim 1, wherein at the step (c), the reading/writing operations through said m memory control means and said m×n input/output channels are synchronized at each large period defined by m×n×h time-slots, where h is a natural number.

8. The method of claim 1, wherein said m×n input/output channels are connected with a plurality of terminals via a network, and at the step (b), the switching means are controlled to connect said m memory control means with said m×n input/output channels selectively and sequentially in accordance with requests for reading/writing of each data issued by the terminals.

* * * * *